S. McC. BROWN.
Churn.

No. 210,090. Patented Nov. 19, 1878.

Witnesses:
W. C. McArthur
John C. Rogers

Inventor:
Samuel M. Brown
per
Alexander & Elliott
Attorneys

UNITED STATES PATENT OFFICE.

SAMUEL McC. BROWN, OF CARTHAGE, MISSOURI.

IMPROVEMENT IN CHURNS.

Specification forming part of Letters Patent No. 210,090, dated November 19, 1878; application filed September 9, 1878.

*To all whom it may concern:*

Be it known that I, SAMUEL McC. BROWN, of Carthage, in the county of Jasper and State of Missouri, have invented certain new and useful Improvements in Churns; and I do hereby declare that the following is a full, clear, and exact description of the invention, reference being had to the accompanying drawings, and to the letters of reference marked thereon, which form part of this specification.

The nature of my invention consists in the construction and arrangement of a churning, gathering, and straining device, as will be hereinafter more fully set forth.

In order to enable others skilled in the art to which my invention appertains to make and use the same, I will now proceed to describe its construction and operation, referring to the annexed drawings, in which—

Figure 1:
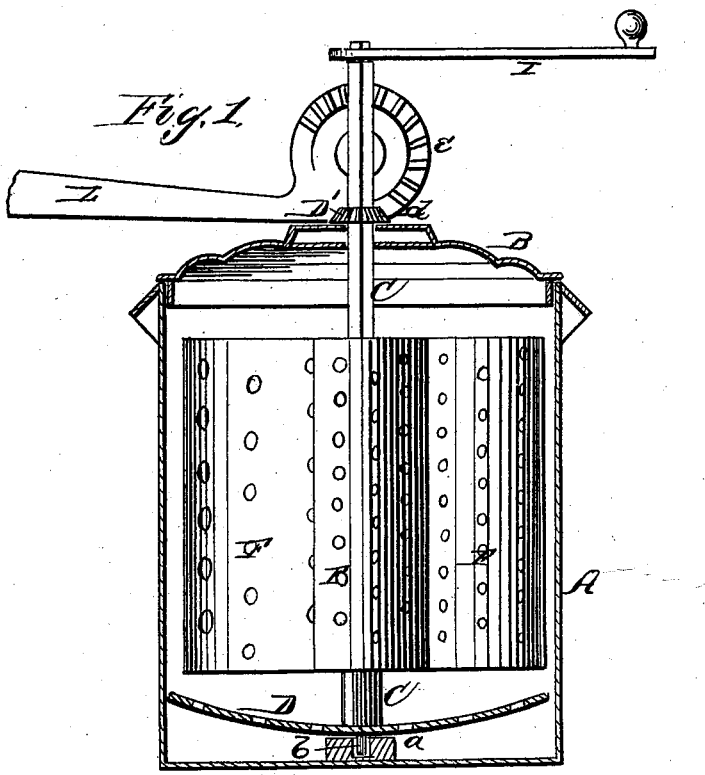
Figure 2:
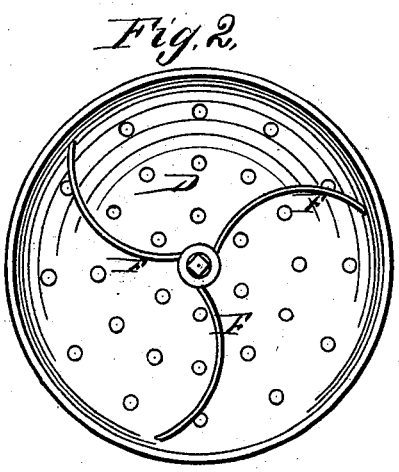

Figure 1 is a central vertical section of my churn. Fig. 2 is a plan view of the same with the top removed.

A represents the churn proper, made in cylindrical form and provided with the top or cover B. In the bottom of the churn A is a central step, $a$, to receive the lower journal, $b$, of an upright shaft, C, the upper end of said shaft passing through a central bearing in the top B, and above said top the shaft is made square, as shown, to receive a bevel-pinion, $d$.

To the lower end of the shaft C is attached a bowl or concavo-convex dish, D, and above said bowl the shaft is provided with a series of vertical curved wings, F F. These wings are all curved in the same direction, and both the wings and the bowl D are perforated with numerous holes.

On the upper side of the top or cover B is a post or standard, to the side of which is pivoted a lever, L, having a series of beveled cogs, $e$, formed thereon, and arranged in segmental form, to mesh with the pinion $d$ on the shaft C.

It will be perceived that there is only a segment of cogs $e$ on the inner circular end of the lever L, leaving a space thereon without cogs, and that when the lever is in one position in gear with the pinion D' a vertically-reciprocating movement of the lever L will cause the segmental cogs to engage with and operate the pinion D', and impart a horizontally-reciprocating movement to the wings F and plate D, attached to the dasher-rod. When the lever L is turned over one hundred and eighty degrees, the teeth $e$ of the segmental gear do not engage with the pinion D', and rotary motion is imparted to the wings F and plate or bowl D by the crank I, moving the milk and butter toward the center. The plate or bowl F acts in conjunction with the wings in breaking up the globules of the milk, and afterward, being perforated, acts as a strainer for the milk and a receptacle for the butter, when the wings and bowl or plate, connected together, are lifted out of the churn-body.

By this construction I obtain four different motions for the cream by the wings when in motion—first, throwing the cream from the center to the circumference, and giving a rotary motion at the same time, and, secondly, by reversing the rotary motion and throwing the cream from the circumference to the center.

For gathering the butter when churned, the operating-lever L is thrown to the opposite side of the churn, so that the cogs $e$ will be disengaged from or out of gear with the pinion $d$, and a crank, I, is then applied on the upper end of the shaft C. By now turning this crank in the right direction the butter will be gathered in the concave sides of the wings.

When the process of gathering is complete, the butter is raised from the churn by means of the bowl D.

I am aware that a churn provided with curved perforated dashers, and having a perforated cup at the bottom, is not new, and I do not claim such, broadly, as my invention; but in such case, as known to me, the cup remains stationary on the bottom of the churn, while the shaft with the dashers revolves, though by lifting out the shaft the cup is also removed. In my invention the perforated bowl is attached rigidly to the shaft and rotates with it, thus causing additional agitation of the milk during the process of churning, and acting also as a strainer for the milk and a receptacle for the butter in removing the dasher-shaft.

Having thus fully described my invention, what I claim as new, and desire to secure by Letters Patent, is—

The churning, gathering, and straining device herein described, consisting, essentially, of the perforated wings F, perforated plate D, shaft C, crank I, lever L, having segmental gear e, and pinion D', as set forth.

In testimony that I claim the foregoing as my own I affix my signature in presence of two witnesses.

SAMUEL McCORCOL BROWN.

Witnesses:
L. F. BROWN,
B. B. CLARK.